US009372722B2

(12) United States Patent
Factor et al.

(10) Patent No.: US 9,372,722 B2
(45) Date of Patent: Jun. 21, 2016

(54) RELIABLE ASYNCHRONOUS PROCESSING OF A SYNCHRONOUS REQUEST

(71) Applicant: International Business Machines Corporation, Armonk, NY (US)

(72) Inventors: Michel E Factor, Haifa (IL); David Hadas, Zichron Yaakov (IL); Elliot K Kolodner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 13/932,008

(22) Filed: Jul. 1, 2013

(65) Prior Publication Data

US 2015/0006481 A1    Jan. 1, 2015

(51) Int. Cl.
*G06F 17/30* (2006.01)
*G06F 17/00* (2006.01)
*G06F 9/48* (2006.01)

(52) U.S. Cl.
CPC .................................... *G06F 9/4843* (2013.01)

(58) Field of Classification Search
CPC ............ G06F 17/30386; G06F 17/30595; G06F 17/30424; G06F 3/061; G06F 17/30171; G06F 3/0689; G06F 9/3851; G06F 9/542; G06F 11/3664; G06F 11/3672; G06F 11/3684; G06F 11/3688; G06F 12/0246
See application file for complete search history.

(56) References Cited

U.S. PATENT DOCUMENTS

| 6,026,424 | A  | * | 2/2000  | Circenis .................... 718/104 |
|-----------|----|---|---------|------------------|
| 6,687,729 | B1 |   | 2/2004  | Sievert et al.   |
| 6,832,310 | B1 |   | 12/2004 | Bailey et al.    |
| 7,260,698 | B2 |   | 8/2007  | Hepkin           |
| 2004/0250000 | A1 | | 12/2004 | Jay et al.      |
| 2006/0136930 | A1 | | 6/2006  | Kaler et al.    |
| 2010/0037222 | A1 | | 2/2010  | Tatsubori et al.|
| 2010/0162244 | A1 | | 6/2010  | Tsai et al.     |
| 2011/0161961 | A1 | | 6/2011  | Fu              |
| 2012/0180030 | A1 | | 7/2012  | Crutchfield et al. |

\* cited by examiner

*Primary Examiner* — Yicun Wu
(74) *Attorney, Agent, or Firm* — Alexa L. Ashworth (57) ABSTRACT

Machines, systems and methods for processing a request in a client-server computing environment are provided. In one embodiment, the method comprises receiving from a client a request submitted to a server for purpose of synchronous processing by the server; assigning the request to a first thread for processing; registering the request with a request registration system, wherein the request is assigned to the first thread for processing, in response to determining that the request is acceptable and may be processed synchronously, wherein the request is unregistered from the request registration system, in response to determining that the first thread completed processing of the request within a first timeline, and wherein an alternative thread is assigned for processing the request asynchronously, in response to determining that the first thread did not complete processing of the request within the first timeline.

23 Claims, 6 Drawing Sheets

RELIABLE ASYNCHRONOUS PROCESSING OF A SYNCHRONOUS REQUEST

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to the reliable asynchronous processing of a synchronous request submitted from a client machine to a server system in a computing environment.

BACKGROUND

In a client-server model, the client machine submits a request for processing to a server system. The server system services the request and returns the results to the client machine. Depending on implementation, a server may service a request either synchronously or asynchronously.

In a synchronous model, the client typically establishes a communication session with the server when a request is submitted to the server. If the request cannot be completed within a predetermined time, the session is terminated and the client will have to submit the request again.

In an asynchronous model, the submitted request by the client is added to a queue. Typically, no session needs to be established between the server and the client. The request is processed asynchronously by the server from the queue when possible.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for processing a request in a client-server computing environment are provided. In accordance with one embodiment, the method comprises receiving from a client a request submitted to a server for purpose of synchronous processing by the server; assigning the request to a first thread for processing; registering the request with a request registration system, wherein the request is assigned to the first thread for processing, in response to determining that the request is acceptable and may be processed synchronously, wherein the request is unregistered from the request registration system, in response to determining that the first thread completed processing of the request within a first timeline, and wherein an alternative thread is assigned for processing the request asynchronously, in response to determining that the first thread did not complete processing of the request within the first timeline.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
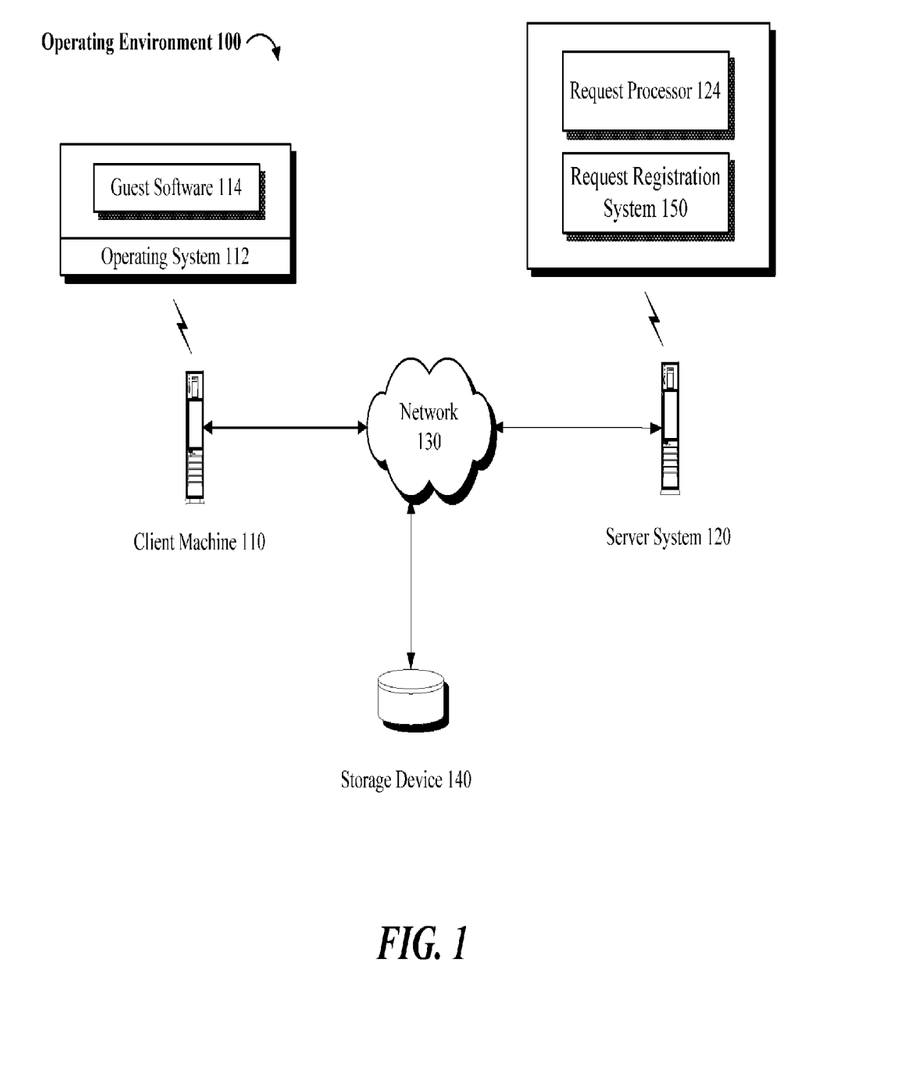
FIG. 1 illustrates an example computing environment in accordance with one or more embodiments, wherein a server system is implemented to service a plurality of requests.

Referring to FIG. 1, an example operating environment 100 is illustrated in which a client machine 110 is in communication with a server system 120 over a network 130. Guest software 114 may be running over an operating system 112 loaded on the client machine 110. In accordance with one aspect, guest software 114 may generate a request that may be submitted to sever system 120 over network 130 for processing. The request may, for example, include instructions for server system 120 to perform one or more operations on data stored on a storage device 140.

Storage device 140 may be locally connected to the server system 120, or remotely connected to server system 120 over network 130. Server system 120 may provide the results of the operations performed on the data to guest software 114 or other software running on client machine 110 (or other machine or device connected to network 130). Server system 120 may have one or more threads to execute the program code for request processor 124 associated with different requests. A request registration system 150 may be provided to register any outstanding requests, for example, as provided in further detail below.

In accordance with one embodiment, it is desirable to configure the operating environment 100, including sever system 120, to allow for real-time requests to be submitted by client machine 110 to server system 120 in a way that server system 120 is capable of robust real-time processing of a request by assigning the request to a first thread for synchronous processing, where the request is expected to be processed by the first thread within an acceptable timeline. It is further desirable that the processing of the submitted request is managed in a reliable manner, so that if the first thread is unable to service the request within the acceptable timeline, then server system 120 reverts to an asynchronous mode, wherein a second thread is assigned to process the request.

Figure 2:
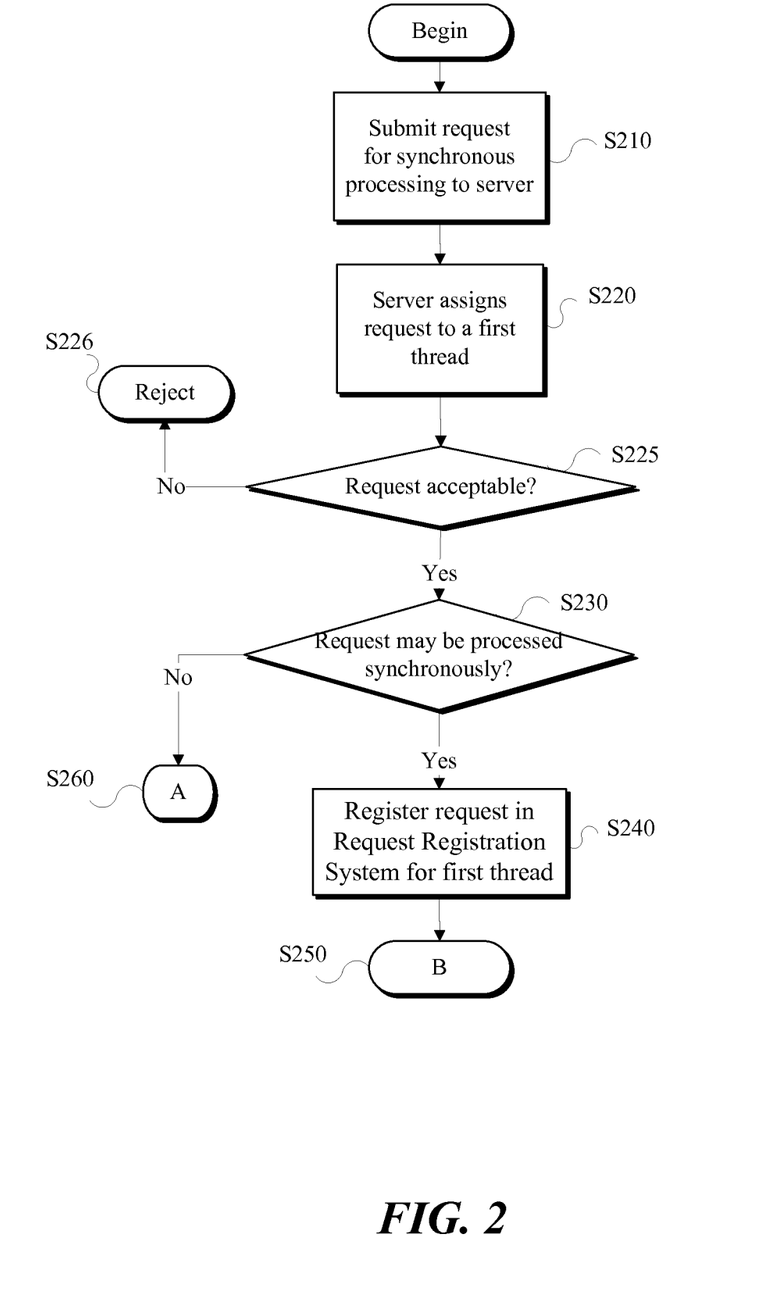
FIG. 2 is an example flow diagram of a method of synchronously processing a request, in accordance with one embodiment.

Referring to FIG. 2, a request may be submitted by client machine 110 to the server system 120 for synchronous processing (S210). Upon receipt, the server system 120 assigns the request to a first thread for synchronous processing within a threshold time (S220). The time threshold may be a predefined (e.g., acceptable) timeline for the servicing of the request. This timeline may be defined by server system 120 or client machine 110. The first thread may determine whether the request is acceptable (S225). For example, a request may be deemed acceptable, if the user has the proper authority and credentials to perform the request.

If the request is not acceptable, server system 120 may reject the request (S226) and terminate the first thread or reassign the thread to serve another request. The first thread then determines whether the request may be processed synchronously (S230), taking into account any known issues that may affect the synchronously processing of the request without delay. If an issue is detected, the first thread may register the request with request registration system 150 (S240). The first thread (or another thread) may be associated as the thread executing the request, for example.

It is noteworthy that to preserve the atomicity of the processing of the request, the first thread may be assigned as the responsible thread (e.g., worker thread) of the request at the same time the request is placed in the request registration system 150. The first thread may then continue to execute the program of request processor 124 and service the request (S250) or attempt to service the request as provided in further detail below (e.g., see S350 in FIG. 3B).

In one embodiment, once the request is accepted and registered with request registration system 150, server system 120 takes on the responsibility to see that the request is processed to completion, whether by attempting to service the request using the first thread or by assigning the request to a second thread, if for some reason, the first thread is unable to successfully service the request within the acceptable timeline. For example, if when the request arrives, the first thread determines that the request may not be processed synchronously, due to a known transient fault in the server system 120, then remedial action may be taken as provided below (S260).

Figure 3A:
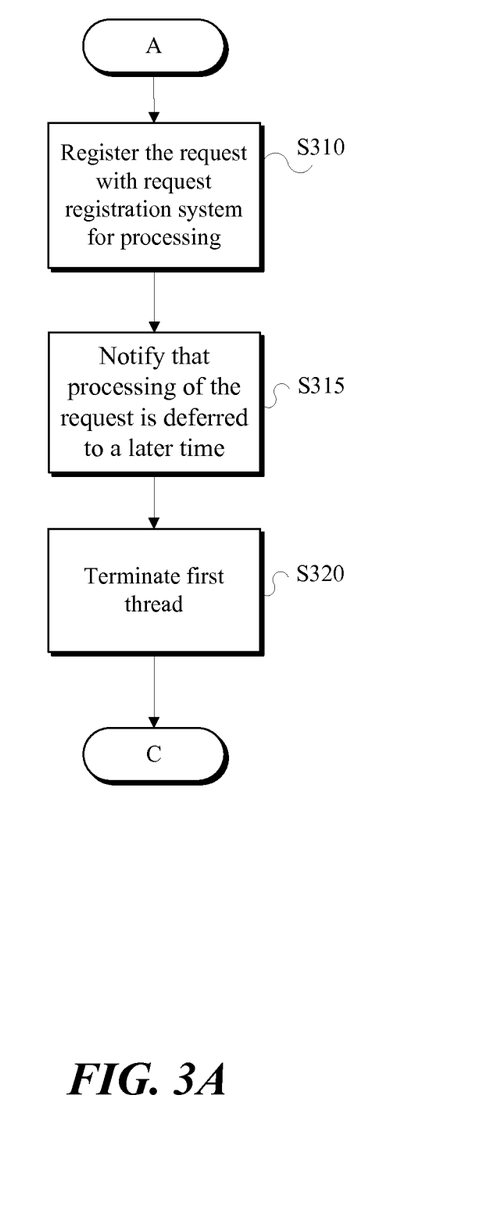
FIGS. 3A and 3B are flow diagram of an example methods for processing a request asynchronously, if attempts to process the request synchronously are unsuccessful, in accordance with one embodiment.

Referring to FIG. 3A, in one embodiment, remedial action may be taken by way of the first thread registering the request with the request registration system 150 for processing but without associating the first thread as the thread executing the request (S310). The first thread may then notify client machine 110 to indicate that the synchronous (i.e., real-time) processing of the request is not achievable at the time and that the processing of the request is deferred to a later time (S315). As such, the request will be performed asynchronously. Thereafter, the first thread either terminates (S320) or is assigned to service another request that may be pending at the time.

Figure 3B:
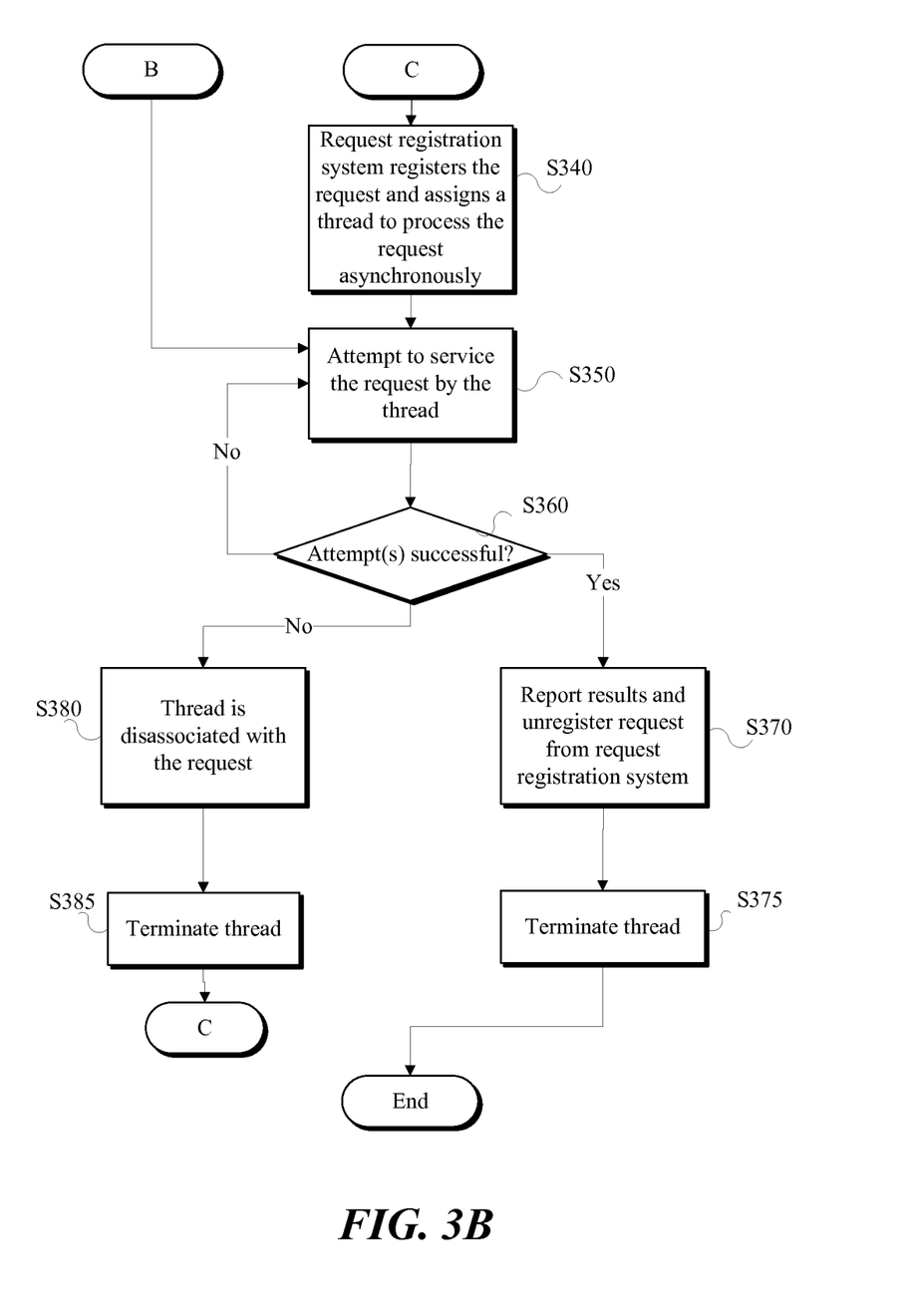

Referring to FIG. 3B, in one embodiment, a request is registered with the request registration system 150 and is assigned to a thread to process the request asynchronously (S340). The thread executes the program of request processor 124 and the thread may attempt to service the request (S350). If the thread successfully services the request (S360), then the results may be reported to the client machine 110, for example, and the request is unregistered from the request registration system 150 (S370) and is terminated (S375) or reassigned to serve another request. In the event that the thread is unable to service the request (e.g., due to unavailability of resources or other transient fault), then the thread may attempt to service the request again within the acceptable time line (S350).

If the additional attempts fail, then the thread disassociates itself from having to service the request (S380) and leaves the request registered with the request registration system 150. The thread may then be terminated (S385) or reassigned to serve another request. In one implementation, the thread may terminate unexpectedly (e.g., due to a fault in the server or the request processor code). Either way, the request registration system 150 may then asynchronously assign a thread to process the request at a later time (S340). The thread then continues to execute the program of request processor 124 and services the request (S350) until it is successful when it unregister the request from the request registration system 150 (S370) or later disassociates itself from the request (S380). The records of the request registration system 150 may be updated to reflect the disassociation of one thread and the association of another thread as the worker thread for servicing the request. A notification of same may be submitted to client machine 110.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
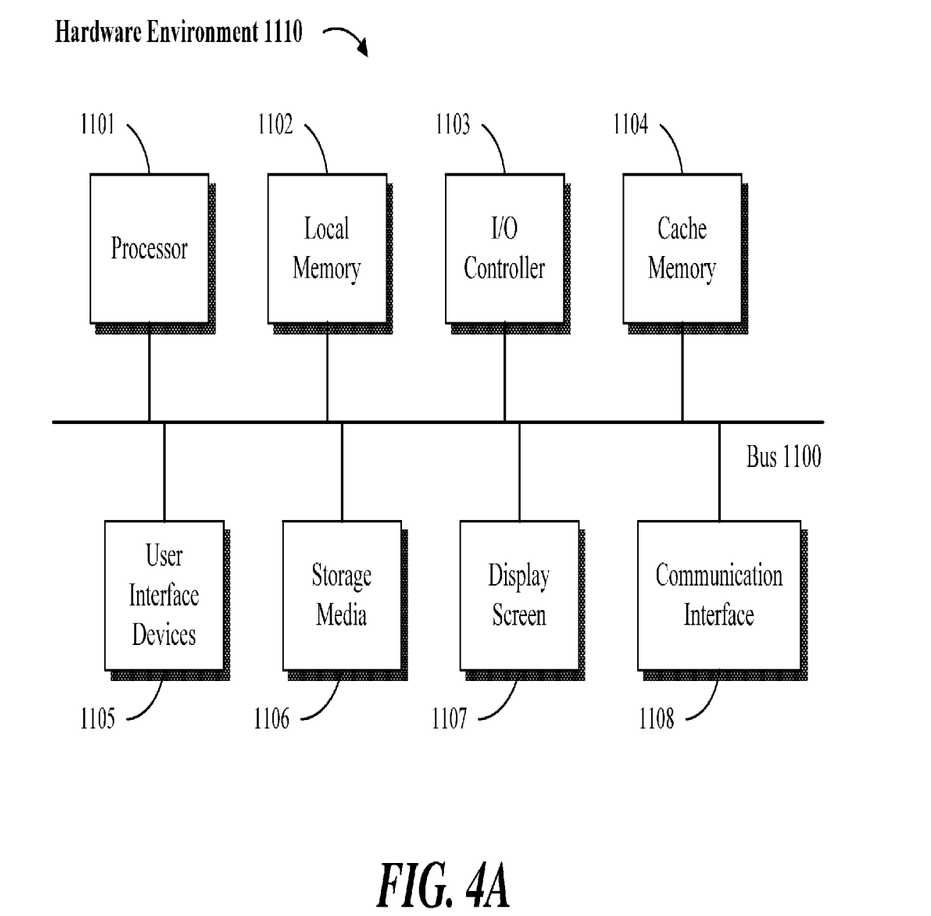
FIGS. 4A and 4B are block diagrams of hardware and software environments in which the disclosed systems and methods may operate, in accordance with one or more embodiments.
Figure 4B:
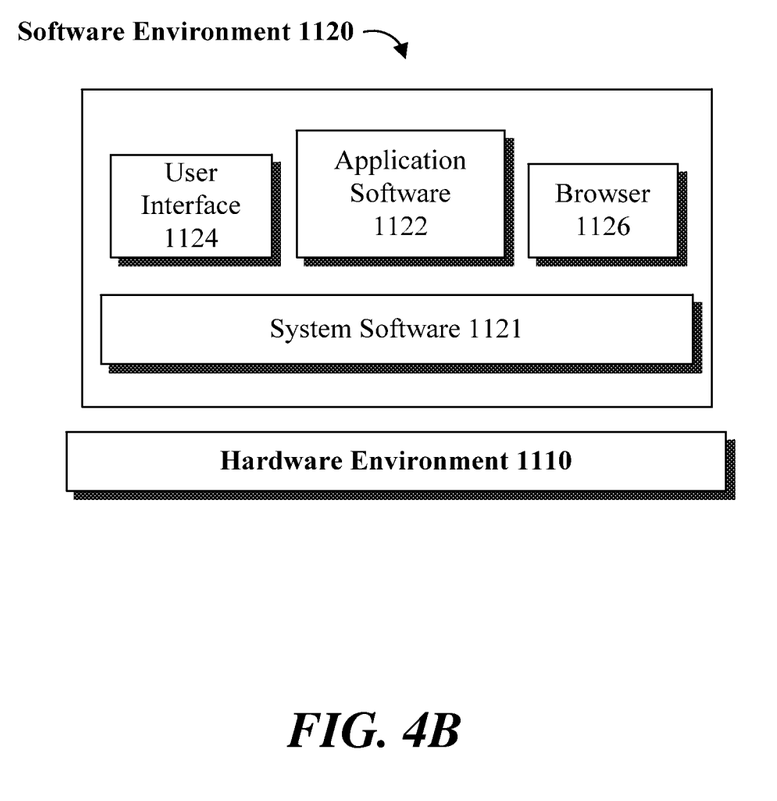

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for processing a request in a client-server computing environment, the method comprising:
  receiving from a client a request submitted to a server for purpose of synchronous processing by the server;
  assigning the request to a first thread for processing within a first timeline, wherein the first timeline is predefined by the client;
  determining, by the first thread, whether the received request is acceptable;
  determining, by the first thread, whether the received request can be processed synchronously, based in part on known issues which affect the synchronous processing of the request without delay;
  in response to determining that the received request is associated with known issues, registering the request with a request registration system, wherein the request is assigned to the first thread for processing and registered with the request registration system at the same time, as one execution unit, and wherein the first thread marks itself as a worker thread executing the request;

executing, by the first thread, a program of the request processor and attempting to service the request;

in response to the first thread successfully servicing the request, reporting results of the execution of the request to the client and unregistering the request from the request registration system;

in response to unregistering the request from the request registration system, terminating the first thread or reassigning the first thread to another request;

in response to the first thread unsuccessfully servicing the request, executing, by the first thread, additional attempts to service the request within a second timeline;

wherein if the additional attempts to service the request within the second timeline fail, then the first thread disassociates from the request, and wherein the request remains registered with the request registration system; and terminating the first thread or reassigning the first thread to service another request.

2. The method of claim 1, further comprising:

in response to determining, by the first thread, that the received request cannot be processed synchronously due to a fault occurring in the server, registering the request, by the first thread, with the request registration system for processing;

notifying the client, by the first thread, that the synchronous processing of the request cannot be completed at that time;

deferring, by the first thread, the processing of the request, to a later time, wherein the request is processed asynchronously at the later time; and terminating the first thread or reassigning the first thread to service another request.

3. The method of claim 2, wherein an alternative thread or a secondary alternative thread is assigned for processing the request asynchronously, and the alternative thread dissociates itself from processing the request, if the alternative thread does not complete processing of the request within the second timeline.

4. The method of claim 1, wherein the request is deemed acceptable, in response to determining that a user has credentials to access resources needed for processing the request.

5. The method of claim 1, wherein the request is processed by a request processor thread executed on the server.

6. The method of claim 1, wherein if the request is deemed unacceptable the request is rejected by the server and the first thread is terminated by the server.

7. The method of claim 1, wherein after the request is determined acceptable and registered with the request registration system, the server is responsible for ensuring that the request is processed to completion, and wherein the server is configured to:

attempt to service the request using the first thread; or assign the request to an alternative thread, if the first thread is unable to service the request.

8. The method of claim 2, wherein the server submits a notification to the client indicating that the request has been registered with the request registration system for processing.

9. The method of claim 2, wherein in response to determining that the first thread assigned to processing the request is terminated due to a fault occurring in the server, the request is asynchronously reassigned to an alternative thread.

10. The method of claim 1, wherein the termination of the execution of a request by a thread and an assignment of the execution of a request to a thread cause for a notification to be sent to the client.

11. The method of claim 1, wherein the first and second timelines are derived from at least one of the client request, client identity, type of service requested, or pre-configuration of the server.

12. The method of claim 1, wherein a monitor is used to detect one or more faults in a thread assigned to process the request, such that in response to detecting a fault, the thread is disassociated from the request at the request registration system.

13. The method of claim 1, wherein when a request registered at the request registration system is assigned to a worker thread, the request registration system automatically disassociates the thread from the request and asynchronously assigns the request to an alternative thread, unless the request is unregistered or disassociated from the worker thread at the request registration system within a timeline.

14. A system for processing a request in a client-server computing environment, the system comprising:

one or more computer processors;

one or more computer readable hardware storage media;

program instructions stored on the one or more computer readable hardware storage media for execution by at least one of the one or more processors, the program instructions comprising:

program instructions to receive from a client a request submitted to a server for purpose of synchronous processing by the server;

program instructions to assign the request to a first thread for processing within a first timeline, wherein the first timeline is predefined by the client;

program instructions to determine whether the received request is acceptable;

program instructions to determine whether the received request can be processed synchronously, based in part on known issues which affect the synchronous processing of the request without delay;

in response to determining that the received request is associated with known issues, program instructions to register the request with a request registration system, wherein the request is assigned to the first thread for processing and registered with the request registration system at the same time, as one execution unit, and wherein the first thread marks itself as a worker thread executing the request;

program instructions to execute a program of the request processor and attempt to service the request;

in response to the first thread successfully servicing the request, program instructions to report results of the execution of the request to the client and unregister the request from the request registration system;

in response to unregistering the request from the request registration system, program instructions to terminate the first thread or reassign the first thread to another request;

in response to the first thread unsuccessfully servicing the request, program instructions to execute additional attempts to service the request within a second timeline;

wherein if the additional attempts to service the request within the second timeline fail, then the first thread disassociates from the request, and wherein the request remains registered with the request registration system; and program instructions to terminate the first thread or reassign the first thread to service another request.

15. The system of claim 14, further comprising:
in response to determining that the received request cannot be processed synchronously due to a fault occurring in the server, program instructions to register the request with the request registration system for processing;
program instructions to notify the client that the synchronous processing of the request cannot be completed at that time;
program instructions to defer the processing of the request, to a later time, wherein the request is processed asynchronously at the later time; and
program instructions to terminate the first thread or reassign the first thread to service another request.

16. The system of claim 15, wherein an alternative thread or a secondary alternative thread is assigned for processing the request asynchronously, and the alternative thread dissociates itself from processing the request, if the alternative thread does not complete processing of the request within the second timeline.

17. The system of claim 14, wherein the request is deemed acceptable, in response to determining that a user has credentials to access resources needed for processing the request.

18. The system of claim 14, wherein the request is processed by a request processor thread executed on the server.

19. A computer program product comprising a non-transitory computer readable storage medium having a computer readable program, wherein the computer readable program when executed on a computer causes the computer to:
receive from a client a request submitted to a server for purpose of synchronous processing by the server;
assign the request to a first thread for processing within a first timeline, wherein the first timeline is predefined by the client;
determine whether the received request is acceptable;
determine whether the received request can be processed synchronously, based in part on known issues which affect the synchronous processing of the request without delay;
in response to determining that the received request is associated with known issues, register the request with a request registration system, wherein the request is assigned to the first thread for processing and registered with the request registration system at the same time, as one execution unit, and wherein the first thread marks itself as a worker thread executing the request;
execute a program of the request processor and attempt to service the request;
in response to the first thread successfully servicing the request, report results of the execution of the request to the client and unregister the request from the request registration system;
in response to unregistering the request from the request registration system, terminate the first thread or reassign the first thread to another request;
in response to the first thread unsuccessfully servicing the request, execute additional attempts to service the request within a second timeline;
wherein if the additional attempts to service the request within the second timeline fail, then the first thread dissociates from the request, and wherein the request remains registered with the request registration system; and
terminate the first thread or reassign the first thread to service another request.

20. The computer program product of claim 19, further comprising:
in response to determining that the received request cannot be processed synchronously due to a fault occurring in the server, register the request with the request registration system for processing;
notify the client that the synchronous processing of the request cannot be completed at that time;
defer the processing of the request, to a later time, wherein the request is processed asynchronously at the later time; and
terminate the first thread or reassign the first thread to service another request.

21. The computer program product of claim 20, wherein an alternative thread or a secondary alternative thread is assigned for processing the request asynchronously, and the alternative thread dissociates itself from processing the request, if the alternative thread does not complete processing of the request within the second timeline.

22. The computer program product of claim 19, wherein the request is deemed acceptable, in response to determining that a user has credentials to access resources needed for processing the request.

23. The computer program product of claim 19, wherein the request is processed by a request processor thread executed on the server.

* * * * *